United States Patent [19]
Astrom et al.

[11] Patent Number: 6,070,051
[45] Date of Patent: May 30, 2000

[54] METHOD AND APPARATUS FOR PREDICTING SERVICE AVAILABILITY FOR A GROUND-TO-SATELLITE RADIO OF A COMMUNICATION SYSTEM

[75] Inventors: Richard Lawrence Astrom, Gilbert; Keith Andrew Olds, Mesa; Norbert Kleiner, Scottsdale; Rodrigo Ibanez-Meier, Chandler; Douglas Roy Tomren, Scottsdale; Randy Lee Turcotte, Tempe, all of Ariz.

[73] Assignee: Motorola, Inc., Schaumburg, Ill.

[21] Appl. No.: 08/963,490

[22] Filed: Nov. 3, 1997

[51] Int. Cl.[7] .................................................. H04B 7/185
[52] U.S. Cl. ...................... 455/12.1; 455/67.6; 455/505; 455/10; 455/427
[58] Field of Search .................................... 455/427–431, 455/423, 528, 504, 505–65, 514, 63, 129, 522, 12.1–13.4, 67.1–67.4; 342/359, 360, 174; 343/757, 754, 703, 786; 370/318

[56] References Cited

U.S. PATENT DOCUMENTS

| | | | |
|---|---|---|---|
| 4,888,596 | 12/1989 | Conanan | 343/703 |
| 4,896,369 | 1/1990 | Adams, Jr. et al. | 455/13.4 |
| 4,910,792 | 3/1990 | Takahata et al. | 455/10 |
| 4,941,199 | 7/1990 | Saam | 455/10 |
| 4,965,851 | 10/1990 | Tejima | 455/505 |
| 5,060,292 | 10/1991 | Ayukawa et al. | 455/505 |
| 5,257,405 | 10/1993 | Reitberger | 455/514 |
| 5,410,736 | 4/1995 | Hoque | 455/504 |
| 5,768,684 | 6/1998 | Grubb et al. | 455/13.4 |
| 5,918,161 | 6/1999 | Kumar et al. | 455/65 |

OTHER PUBLICATIONS

"Photogrammetric Mobile Satellite Service Prediction", by Riza Akturan and Wolfhard J. Vogel from NAPEX 94, Vancouver, BC Jun. 17, 1994.

"Path Diversity for LEO Satellite–PCS In The Urban Environment", by Riza Akturan and Wolfhard J. Vogel, from EERL–95–12A, Dec. 13, 1995.

"Image Analysis As A Tool For Satellite–Earth Propagation Studies", by Riza Akturan, Hsin–Piao Lin and Wolfhard J. Vogel, Proceedings of NAPEX XX, Jun. 4–6, 1996, Publication Sentel, 1996, pp. 243–255.

Saunders, S.R.; Evans, B.G. "A physical–statistical model for land mobile satellite propagation in built–up areas" Antennas and Propagation, Tenth International Conference on (Conf. Publ. No. 436) vol.: 2, Apr. 1997, pp.: 44–47 vol. 2.

Obara, N.; Wakana, H. "Fade/non–fade duration characteristics and a model for land mobile satellite communication channels" Antennas and Propagation Society International Symposium, 1992. AP–S. 1992 Digest. Held in Conjunction with: URSI Radio Science Me, Jul. 1992.

Barts, R.M.; Stutzman, W.L. "Modeling and simulation of mobile satellite propagation" Antennas and Propagation, IEEE Transactions on. vol.: 40 4, Apr. 1992, pp.: 375–382.

Vogel, W.J.; Goldhirsh, J. "Fade measurements at L–band and UHF in mountainous terrain for land mobile satellite systems" Antennas and Propagation, IEEE Transactions on. vol.: 36 1, Jan. 1988, pp.: 104–113.

*Primary Examiner*—Dwayne D. Bost
*Assistant Examiner*—Charles R Craver
*Attorney, Agent, or Firm*—Bradley J. Botsch

[57] ABSTRACT

A method and apparatus predicts a ground-to-satellite terminal's (16) percentage of successful communication linkage time to at least one satellite of a communication system in response to a terminal blockage profile (410), as created from the location of an antenna of the terminal, and a satellite blockage profile (412). The prediction may also be based upon a weather model data base (358) corresponding to the area where the terminal is located.

23 Claims, 8 Drawing Sheets

METHOD AND APPARATUS FOR PREDICTING SERVICE AVAILABILITY FOR A GROUND-TO-SATELLITE RADIO OF A COMMUNICATION SYSTEM

CROSS REFERENCE TO RELATED APPLICATION

This application is related to co-pending application having Ser. No. 08/845,487, filed on Apr. 25, 1997 and assigned to the same assignee of this application.

FIELD OF THE INVENTION

This invention relates generally to the field of wireless communications, and more particularly to predicting the service availability for a ground-to-satellite radio of a satellite communication system.

BACKGROUND OF THE INVENTION

The frequency allocations for wireless communication networks employing non-geosynchronous satellite communications normally reside in the UHF-, L-, S-, and K-Band frequencies or higher. Wireless communication systems utilizing K-Band frequencies require a clear line-of-sight between each node of the communication network for high-quality communications. Objects such as trees, utility poles, mountains, buildings, and overpasses that lie along the communications path will effectively fade or block the communication transmissions at K-Band frequencies and higher, therefore degrading, interrupting, or terminating the communication path.

Further, for a ground-to-satellite radio communication link that utilizes low-earth orbiting satellites which move across the sky and rise and set at the horizon, the percentage of the time that the communication link is available varies considerably depending upon the buildings, trees and other blocking items in the vicinity of the ground antenna. Customers of these systems, however, are typically not aware of the percentage of time that their link will be degraded or blocked due to such obstacles or due to rain or the existence of other atmospheric conditions whereby the possession of such knowledge provides a real-time measure of how reliable the radio will be able to communicate with one or more satellites, and enables optimal antenna location of the radio by ascertaining which location yields the best percent time linkage availability.

Therefore, what is needed is a system and a method that combines a sky blockage profile, satellite pass tracks across the sky and a radio location's weather model to predict an individual ground-to-satellite radio's percentage of successful communication linkage time with one or more satellites of a satellite communication system.

BRIEF DESCRIPTION OF THE DRAWINGS

The foregoing and further and more specific objects and advantages of the instant invention will become readily apparent to those skilled in the art from the following detailed description thereof taken in conjunction with the drawings in which.

DETAILED DESCRIPTION OF A PREFERRED EMBODIMENT

Figure 1:
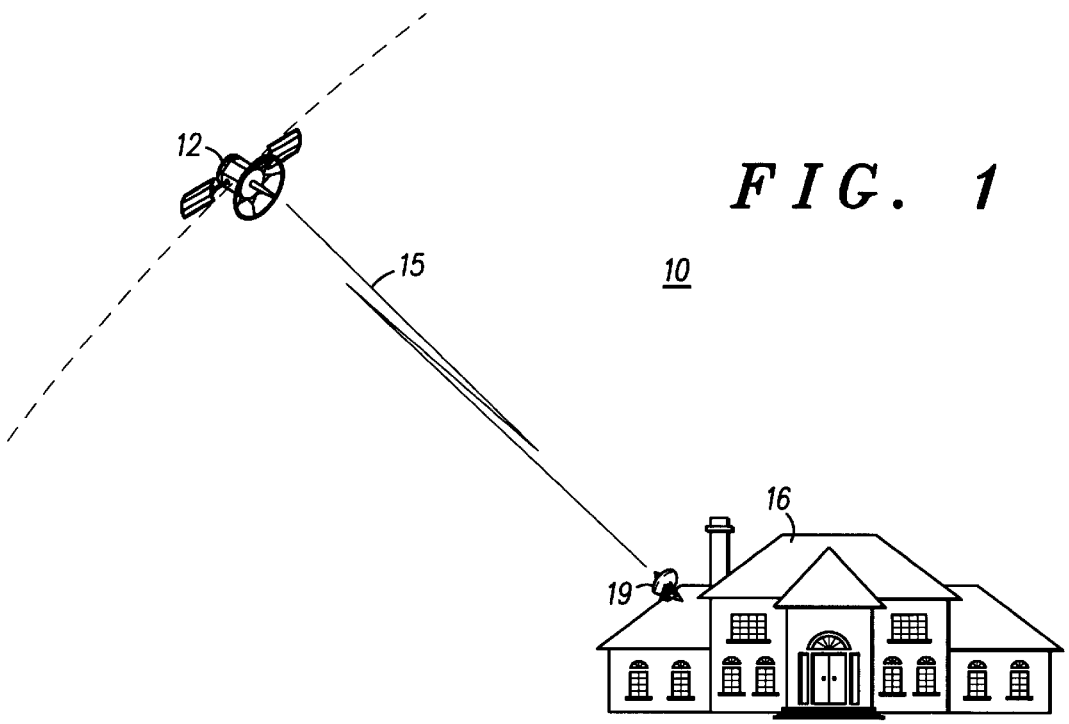
FIG. 1 illustrates a communication system for providing terminal-satellite communication links in accordance with a preferred embodiment of the present invention.

The present invention provides, among other things, a method and a system that combines a sky blockage profile, satellite pass tracks across the sky and a location's weather model to predict an individual ground-to-satellite radio's percentage of successful communication linkage time to one or more satellites of a satellite communication system. By predicting the percentage of time that a radio will be able to successfully communicate with one or more satellites, the user of the radio will be provided with a realistic expectation of the quality of service capable of being delivered to such user. Further, such a prediction tool may be used to choose an optimal antenna location on a user's building thereby giving the user the best antenna placement to ensure the terminal's highest percentage of communication with one or more satellites.

Wireless communication systems which operate at relatively high operating frequencies such as K-Band frequencies or higher, require unobstructed lines-of-sight between the nodes of the communication system to maintain high-quality communication pathways or links. If one or more obstructions partially or completely block a line of sight between the nodes, degradation, interruption, and/or termination of a communication pathway or link can result.

Non-geosynchronous satellite-based communication systems normally incorporate broadband services utilizing relatively high frequency allocations in communication links between one or more non-geosynchronous satellites and terminals based below, near, or above the surface of the earth. Non-geosynchronous satellites continuously move about the earth in predetermined orbital traverses. Therefore, in non-geosynchronous satellite-based communication systems, the quality of the communication pathways or links necessarily depends on the ability of the communication system to maintain the communication links in the presence of potential blocking, fading, interference and other factors that can severely affect communication pathways or links. Thus, unobstructed direct lines-of-sight between terminals and satellites are necessary to maintain the communication pathways at an adequate level of service.

With regard to earth-based or ground-based terminals, the motion of non-geosynchronous satellites with respect to the ground ultimately presents problems when one or more of the satellites reside at sufficiently low elevation angles relative to the terminals because of the line-of-sight blockage that ultimately occurs as a result of trees, buildings, mountains, and the like between the terminals and the satellites. Thus, to maintain the communication pathways or links, it is necessary to switch or hand-off the communication link or links from the obstructed satellite to another satellite in clear line-of-sight of the terminal. Although current algorithms are designed to switch or hand-off from a satellite which is about to drop below a minimum elevation angle to a new one which is higher than the minimum elevation angle with respect to the terminal, the present invention has the capability to respond to the localized environmental obstructions around the terminal in order to maintain one or more communication links and to inhibit fading and blocking of one or more communication links.

It is contemplated that communication terminals include those that could be either continuously or intermittently mobile or positioned in a permanent location such as on the roof of a user's building/house. Terminals could be individual ground-based customer premises units or a primary communication system control facility. It is also contemplated that terminals could be located anywhere below, near, or above the surface of the earth when suitable and practical.

In this regard, the field of view of a selected terminal at any location normally suffers from varying elevations of obstructions that can degrade, interrupt, and/or terminate communication links between the terminal and one or more of the non-geosynchronous satellites located at low elevation levels. The present invention increases the efficiency and economy of non-geosynchronous satellite-based communication systems utilizing relatively high-band frequencies and minimizes degradation, interruption, and termination of one or more of the communication links as a result of local environmental obstructions that can compromise the line-of-sight between terminals and satellites. The present invention is not only advantageous in combination with K-Bands and other higher frequency bands, but also any frequency band that is prone to fade and blockage as a result of obstructions or interference.

Referring to FIG. 1, communication system 10 for facilitating one or more terminal-satellite communication links is shown. Reference communication elements of communication system 10 are represented satellite 12 and terminal 16. Satellite 12, also referred to as a node, transmits and maintains communication pathway or link 15 with a terminal 16 having an antenna 19 or other mechanism suitable for maintaining a communication link with one or more satellites 12. With respect to the present disclosure, satellite 12 is non-geosynchronous in relation to terminal 16. In alternate embodiments of the present invention, system nodes could be devices other than satellites 12. For example, a node could be a ground-based or aircraft-mounted transceiver. In addition, some of the advantages of the present invention could be realized where the node is stationary.

Consistent with the foregoing discussion, terminal 16 could be positioned below, near, or above the surface of the earth. In addition, terminal 16 could be mobile, movable from one location to another, or positioned in a permanent location. However, to facilitate ease of discussion, terminal 16 is a terrestrial ground-based terminal located at a selected position upon the surface of the earth. Communication system 10 operates at relatively high operating frequencies such as K-Band frequencies or higher. As a result, unobstructed lines-of-sight are desirable or required between one or more satellites 12 and terminal 16 to maintain one or more communication pathways or links 15.

Figure 2:
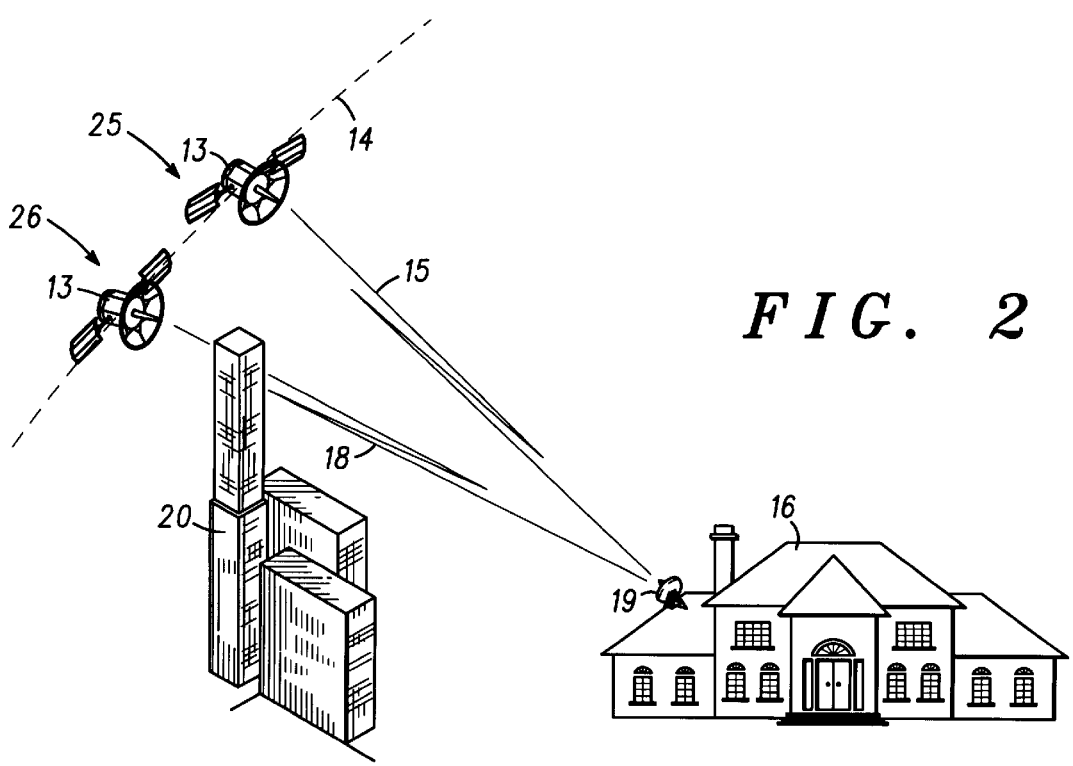
FIG. 2 illustrates a time stepped position of a satellite of the communication system of FIG. 1, a terminal, and a structure blocking a communications path between the satellite and the terminal in accordance with a preferred embodiment of the present invention.

To illustrate the anomaly and environment of fading and blocking, attention is directed to FIG. 2. In FIG. 2, illustrated is a time stepped position of a satellite 13 of communication system 10. Also shown is terminal 16 and communication link 18 maintained by and between satellite 13 and antenna 19 of terminal 16. A structure 20 is further shown positioned intermediate terminal 16 and satellite 13 when satellite 13 is in position 26. Arrowed line 14 indicates a flight path of satellite 13 along a predetermined orbital traverse. Satellite 13 is shown as it might appear at two different positions, position 25 and position 26, at two different instances along its flight path. Position 25 of satellite 13 is somewhat more elevated relative terminal 16 than position 26. In position 25, the line-of-sight and communication link 18 between satellite 13 and terminal 16 are completely unobstructed. However, in position 26, the line-of-sight and communication link 18 between satellite 13 and terminal 16 are obstructed by structure 20 which could result in either the degradation, interruption, or termination of communication link 18.

Consistent with the foregoing discussion, and like other ground-based terminals, terminal 16 could be present in rural, suburban, or urban areas. At any of these locations, terminal 16 could have a 180 degree field of view having varying degrees of localized signal obstructions such as trees, shrubs, utility poles, small and large buildings, bridges and the like above which the user sky is unobstructed and below which the user sky is partially or totally obstructed. At any location at which terminal 16 resides, the localized signal obstructions define a localized fade and blockage environment.

Regarding fading and blocking, each are greatly dependent upon the nature of the environmental obstructions. For instance, communication pathways normally experience shadowing when the line-of-sight between the satellite and the terminal is obstructed by trees and shrubs whereby K-Band signals are typically completely blocked by trees, or the like. In this regard, the degree of shadowing, or partial blockage, is greatly dependent upon the frequency of the carrier and the amount of foliage present upon the trees and bushes and other similar plant growth. Although shadowing does not necessarily block a communication pathway, its presence greatly diminishes the quality of the communication pathway and can lead to the eventual termination of the communication pathway. On the other hand, communication pathways normally experience complete blockage when the line-of-sight between the satellite and the terminal is obstructed by mountains and structures such as buildings or overpasses. In these cases, the line-of-sight becomes completely obstructed, often resulting in the termination of the communication pathway.

To accommodate local environmental obstructions and to increase the economy, efficiency, and reliability of communication system resources, the method and apparatus of the present invention operate to ascertain the blockage environment or the nature of local environmental obstructions present within the field of view of the terminal in order to establish where the user sky is clear, where it is shadowed by trees or shrubbery, and where it is blocked as a result of mountains and structures such as buildings or overpasses to accurately and reliably predict an individual ground-to-satellite terminal's percentage of successful communication linkage time to one or more satellites of a satellite communication system.

Figure 12:
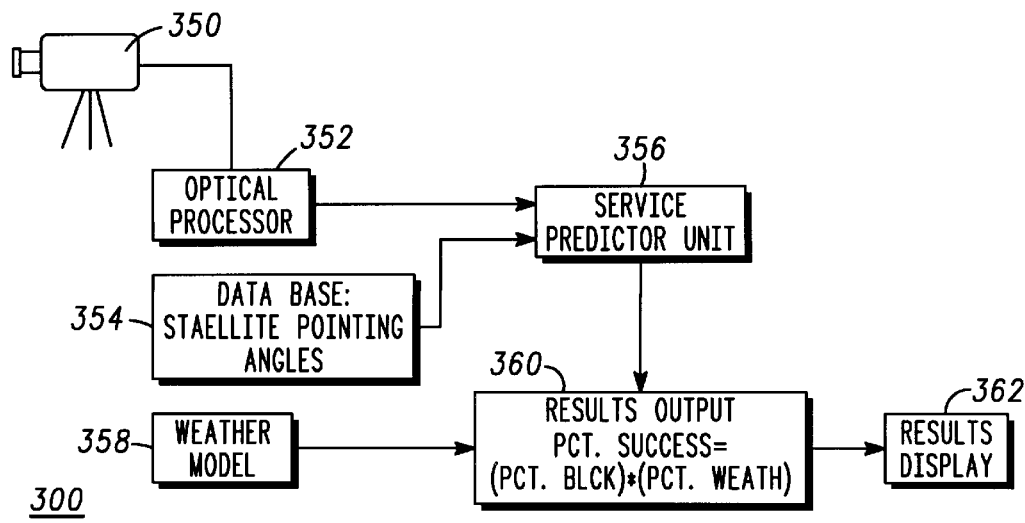
FIG. 12 is a block diagram of an apparatus for accurately and reliably predicting an individual ground-to-satellite terminal's percentage of successful communication linkage time to one or more satellites in accordance with a preferred embodiment of the present invention.

Referring to FIG. 12, block diagram 300 for accurately and reliably predicting an individual ground to satellite terminal's percentage of successful communication linkage time to one or more satellites is shown. Block diagram 300 includes fisheye lens camera 350 having a hemispherical fisheye lens that is typically on a telescoping pole long enough to reach the peak of a roof to where the antenna of the terminal is to be placed. The camera may be stabilized horizontally and north may be identified on the resulting photograph.

Figure 4:
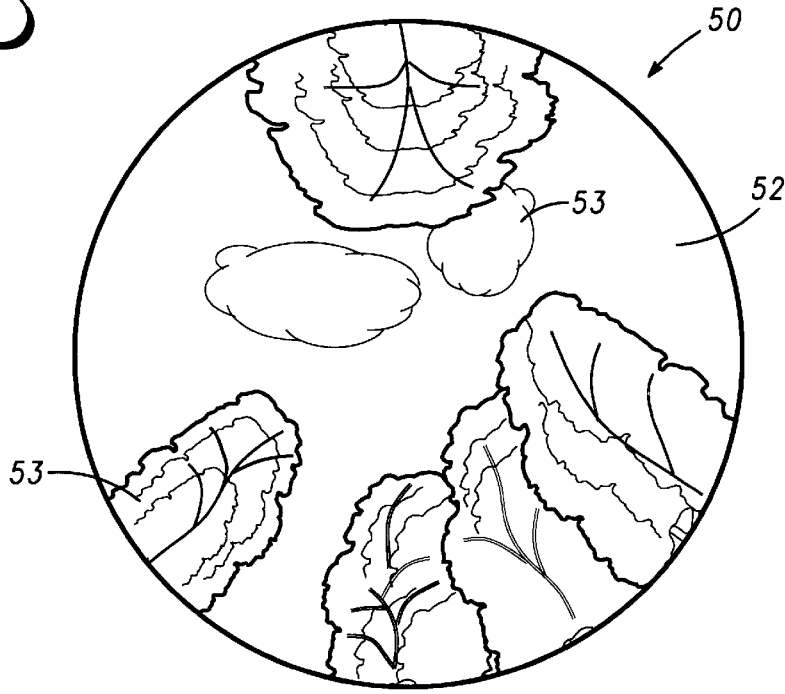
FIG. 4 is a representation of a field of view of a terminal illustrating potential signal obstructions in accordance with a preferred embodiment of the present invention.

With momentary reference to FIG. 4, shown is a representation of a terminal antenna field of view 50 taken at the site of terminal 16 and illustrating potential signal environment obstructions 52. Field of view 50 illustrates obstructions 52 present at low signal angles which may lead to fading and blocking. Although obstructions 52 are herein shown as trees and shrubs and the like, obstructions 52 could also include mountains, buildings or other obstructions. Obstructions 52 bound a clear and unobstructed users sky 53. Field of view 50 essentially defines the blockage profile at the antenna of the terminal at the site, i.e., at antenna 19 of terminal 16, for example.

Figure 8:
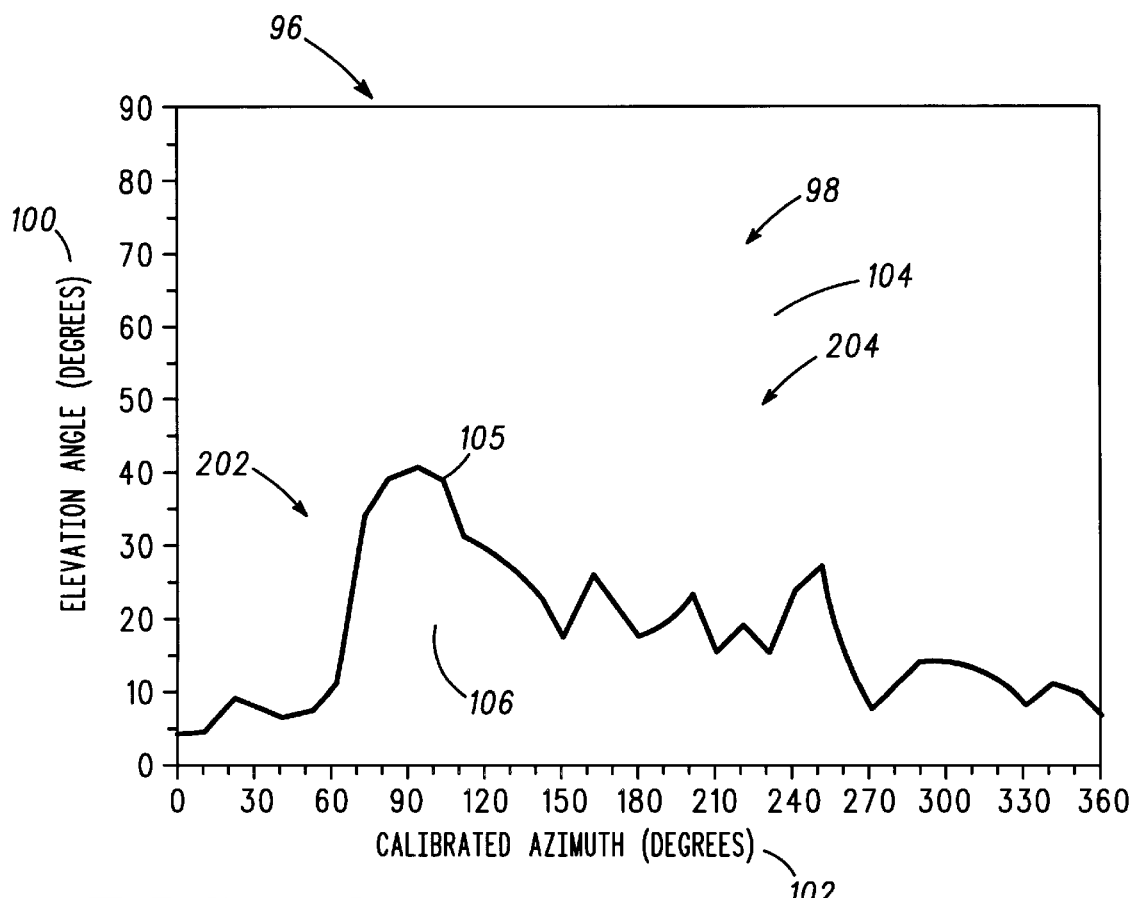
FIG. 8 is an optical terminal blockage profile of a field of view of a terminal derived in accordance with a preferred embodiment of the present invention.

The output of camera 350 is a fisheye photograph, similar to one shown in FIG. 4, that is input to optical processor 352 for creating a blockage map of the sky as its output. An example of such a blockage map created by processor 352 is illustrated in FIG. 8 and will be described in detail hereinafter. The blockage map of the sky typically includes digital values representing block/shadowed/clear for each pixel of the photograph. It is understood that camera 350 and processor 352 may take the form of a laser range finder which does not take a photograph, but directly generates sky blockage data typically in rectangular form.

The system also includes data base 354 which includes the pointing angles, both azimuth and elevation, to all visible system satellites as a function of time, for a time period calculated to be a large enough sample to represent all times. The creation of such a database is known in current technology and will be described hereinafter.

Service predictor unit 356 combines the sky blockage map from processor 352, with the satellite pointing angles from database 354, to determine a percentage of the system availability, i.e., communication linkage time with one or more satellites, for the location of the terminal where the photo was taken. The output of service predictor unit 356 is a percentage that indicates the availability of successful communication from antenna 19 of terminal 16 (at which the fisheye lens camera photo was taken) to one or more satellites of the satellite communication system. In a preferred embodiment, service predictor 356 is implemented in computer software whereby its processing steps are described in detail with respect to FIG. 13.

Block diagram 300 also includes weather model 358, which is typically in the form of a computer database, and represents a prediction of system availability for non-blocked sky based upon the weather model and the frequency, broadcast and antenna characteristics of the system for the general area of the terminal location. The output of the weather model 358 is a percentage of system success due to atmospheric conditions.

Results output 360 is responsive to the outputs of service predictor 356 and weather model 358 and presents the predicted system availability success percentage for the antenna location of the terminal. This result is determined by combining, i.e., multiplying, the percentage availability using the sky blockage map and the percentage availability using the weather map.

Finally, display 362 displays a final percentage as determined from the results output block 360.

Figure 3:
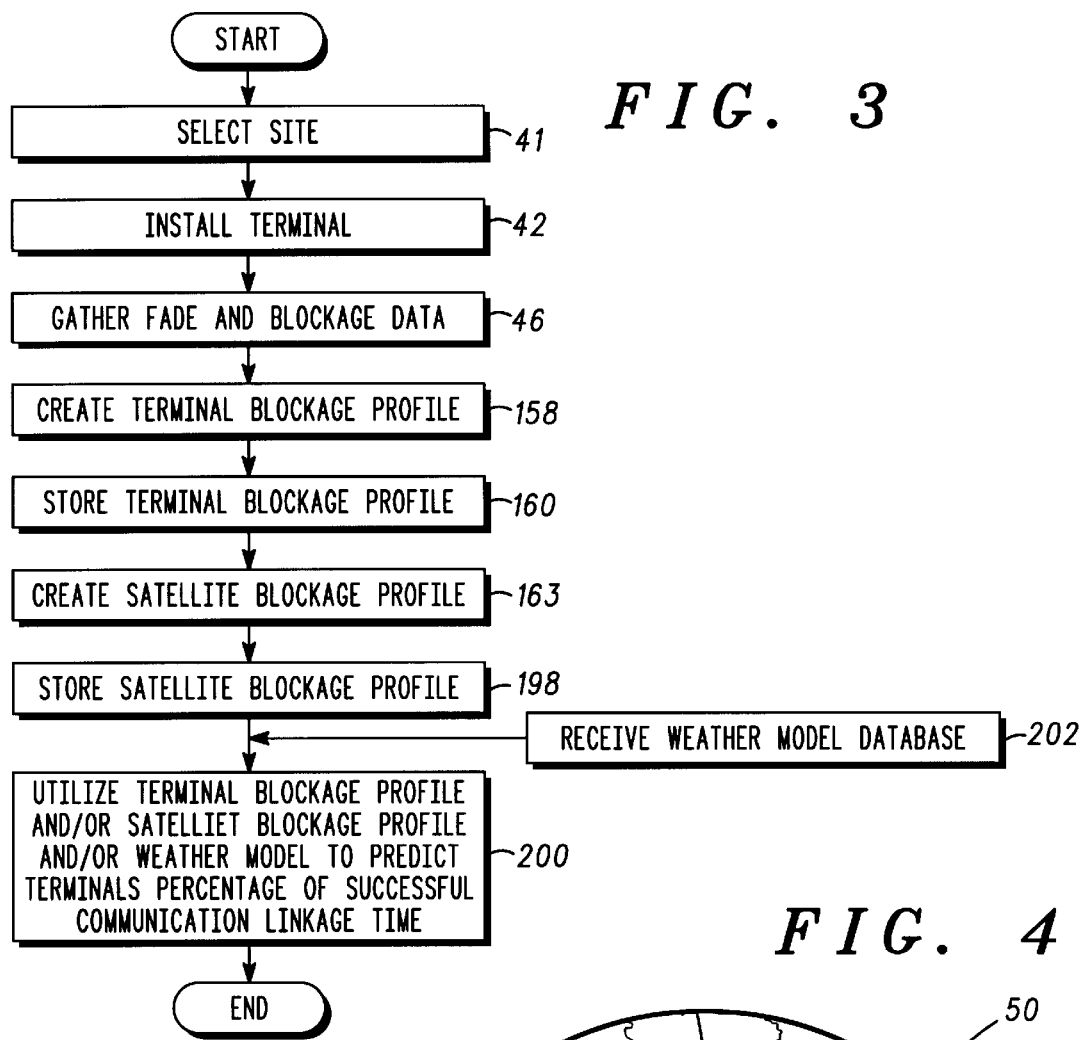
FIG. 3 is a flow chart of a method of establishing and responding to a blockage environment in a communication system in accordance with a preferred embodiment of the present invention.

Referring to FIG. 3, there is illustrated a flow chart of a method of establishing and responding to a blockage environment in a communication system to accurately and reliably predict an individual ground-to-satellite terminal's percentage of successful communication linkage time to one or more satellites of a satellite communication.

The present method begins by selecting a site in task 41 at which terminal 16 will reside and then installing terminal 16 in task 42 at a either a rural, suburban, or urban area.

After the site has been selected and terminal 16 installed, a task 46 is performed to gather fade and blockage data present within the field of view 50 of the terminal antenna. This task may be performed by camera 350 (of FIG. 12), for example. For clarity, fade and blockage data is essentially comprised of the physical environment of the terminal antenna field of view 50 and of obstructions 52 shadowing or blocking user sky 53. In one embodiment, fade and blockage data could be simply depicted as a binary condition, where, for a particular point in the terminal field of view, a zero could represent a clear condition and a one could represent a blocked condition, for example. In other embodiments, fade and blockage data could indicate a relative degree of blocking. For example, a scale of one to ten could be used to indicate how shadowed a signal is at a particular point. For example, a zero could indicate that no shadowing exists along the line of sight. A three could indicate that a mild obstruction (e.g., a tree) exists along the line of sight. A ten could indicate a complete blockage condition. This binary or relative degree depiction of a blockage environment could be applied to both a terminal blockage profile and a satellite blockage profile, both of which will be described in detail below.

As will be described in conjunction with FIGS. 5–10, task 46 could be performed in a variety of ways suitable for allowing a user to easily and efficiently establish a terminal blockage profile. Three exemplary ways of gathering fade and blockage data are: (1) using field of view (e.g., optical) data (FIG. 7) such as via fisheye lens camera 350; (2) using the signature of the signals due to blocking (FIG. 5) (e.g., Fresnel diffracted signal measurements); (3) using backscatter signal data (FIG. 9); and (4) using a directional laser range finder. Preferred embodiments of these three ways of gathering fade and blockage data will now be described, although other ways of gathering fade and blockage data also could be used.

Figure 7:
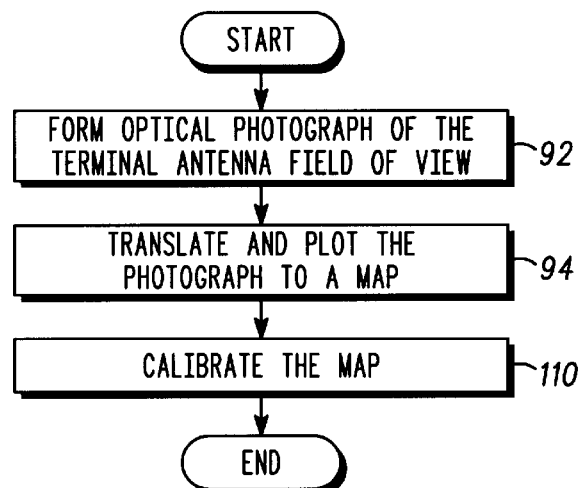
FIG. 7 is a flow chart of a method of creating an optical terminal blockage profile in accordance with a preferred embodiment of the present invention.

Referring back to FIG. 3, task 46 may be performed by creating a terminal blockage profile of a field of view of the terminal antenna. In a preferred embodiment, a terminal blockage profile of a field of view of the terminal antenna is derived from optical data. However, in alternate embodiments, the field of view of the terminal antenna could be derived from data measurements anywhere along the spectrum (e.g., optical, infrared, ultraviolet). FIG. 7 is a flow chart of a method of creating an optical terminal blockage profile in accordance with a preferred embodiment of the present invention. In this regard, the optical terminal blockage profile corresponding to field of view 50 is initiated in task 92 by first forming an optical photograph or representation of field of view 50 of the terminal antenna with a fisheye lens camera (such as camera 350 of FIG. 12) having a full 180 degrees field of view.

The reduction of a fisheye optical photograph of a selected field of view is described in Akturan & Vogel, *Photogrammetric Mobile Satellite Service Prediction*, NAPEX 94 (Jun. 17, 1994). The optical photograph, of which would be generally representative to field of view 50 shown in FIG. 4, is then translated and mapped or plotted via an algorithm or other means in task 94 in the form of a map 96 as evidenced in FIG. 8.

FIG. 8 is an exemplary optical terminal blockage profile of a field of view of a terminal derived in accordance with a preferred embodiment of the present invention. Map 96 corresponds to a two dimensional blockage profile 98 of an optical representation of field of view 50 of terminal 16 plotted in the form of elevation angle 100 as a function of azimuth angle 102 with area 104 above curve 105 corresponding to unobstructed user sky 53 in which communication may take place and area 106 below curve 105 corresponding to a blockage region defined by obstructions 52 present within field of view 50 in which communication may not take place. Map 96 represents a typical output of optical processor 352 of FIG. 12.

Referring back to FIG. 7, once plotted, calibration of map 96 takes place in task 110. In a preferred embodiment, calibration of map 96 involves determining the direction of zero degrees in azimuth via a compass or other suitable mechanism to establish a coordinate system for terminal 16. Completion of tasks 92–110 result in the creation of an optical terminal blockage profile.

Figure 5:
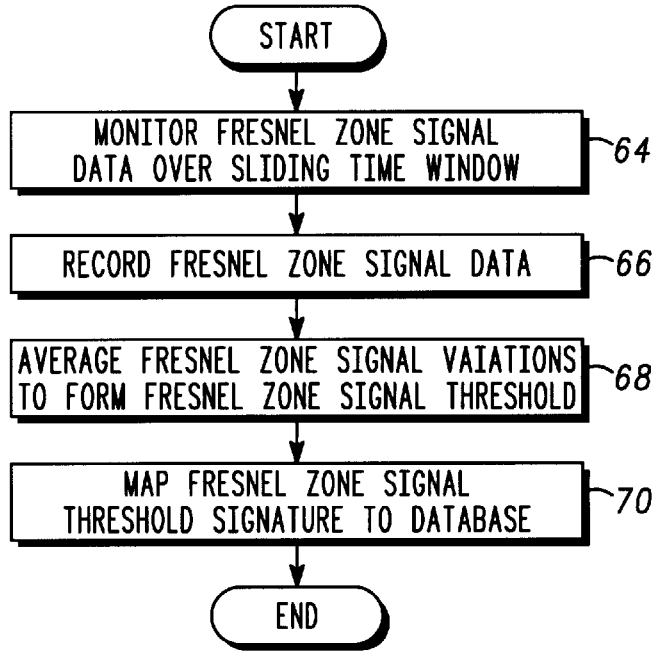
FIG. 5 is a flow chart of a method of creating a terminal blockage profile based on Fresnel diffracted signals in accordance with a preferred embodiment of the present invention.

Additionally, task 46 could be performed by creating a terminal blockage profile based on Fresnel diffracted signals. FIG. 5 is a flow chart of a method of creating a terminal blockage profile based on Fresnel diffracted signals in accordance with a preferred embodiment of the present invention. In alternate embodiments, other methods can be used which indicate blockages from signal measurements.

In a terminal-satellite communication system utilizing broadband channels, when the line of sight between the satellite and the terminal is unobstructed, the signal strength of the communication link is nearly constant. However, as the satellite moves in the user sky in relation to the terminal and the line-of-sight is about to be shadowed or blocked by an approaching obstruction, the Fresnel diffracted signal strength fluctuates as evidenced by rapid variations in the diffracted signal's amplitude. The variance in the amplitude of the Fresnel diffracted signal indicates that shadowing or blockage is about to occur as a result of an approaching obstruction.

Large objects such as mountains, buildings, and similar structures result in large variations in the Fresnel diffracted signal amplitude. In any event, the signature of the Fresnel diffracted signal will exhibit certain strength characteristics evidenced by variances in the Fresnel diffracted signal amplitude depending upon whether the line-of-sight between the satellite and the terminal is unobstructed, about to experience partial or total obstruction, shadowing, partial obstruction, and total obstruction.

Referring to FIG. 5 and pursuant to the foregoing, Fresnel diffracted signal data from one or more communication pathways or links is monitored over a sliding time window in task 64. The Fresnel diffracted signal data could be monitored either at terminal 16 or at one or more of the satellites 12 of the constellation of satellites. The Fresnel diffracted signal data is recorded in task 66 either at terminal 16 or at one or more of the satellites 12. The variations in the signal strength or amplitude of the Fresnel diffracted signal is then averaged or normalized in task 68 to create a Fresnel diffracted signal threshold or signature. In a preferred embodiment, the Fresnel threshold corresponds to an average signature of Fresnel diffracted signals for an average communication pathway within the field of view 50 of terminal 16. In alternate embodiments, the Fresnel threshold could be set at a different level. The Fresnel threshold is then mapped or plotted to a database in task 70 in the form of a map. Completion of tasks 64–70 result in the creation of a terminal blockage profile based on Fresnel diffracted signals.

Figure 6:
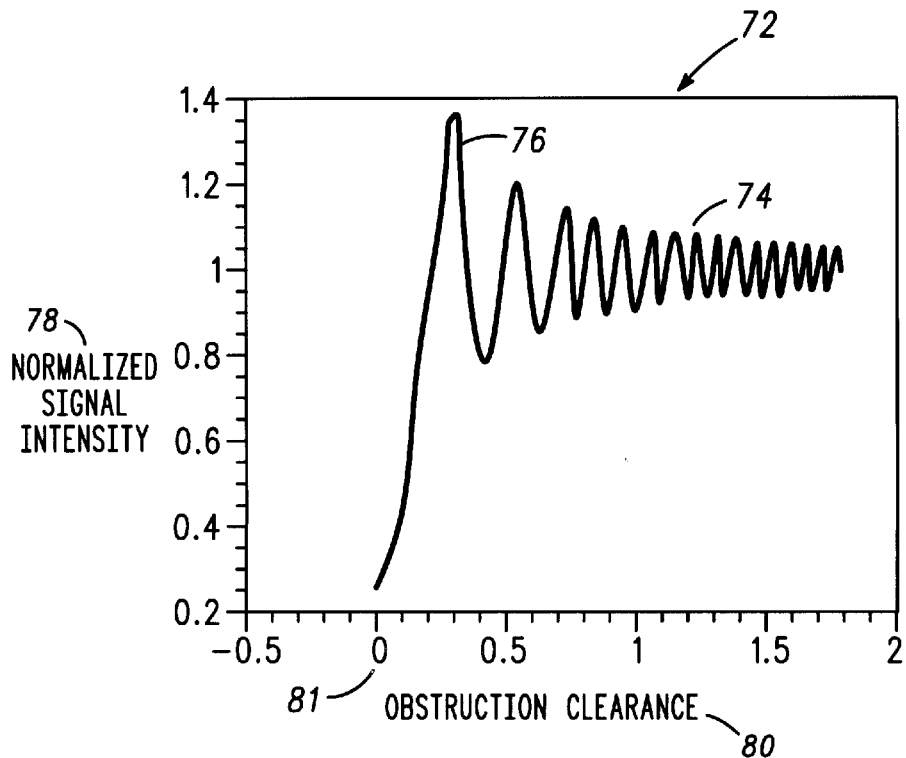
FIG. 6 is a graphical diagram based on Fresnel diffracted signals for a field of view of a terminal derived in accordance with a preferred embodiment of the present invention.

FIG. 6 is pictorial diagram based on Fresnel diffracted signals which shows a Fresnel threshold for a field of view of a terminal derived in accordance with a preferred embodiment of the present invention. Graph 72 corresponds to a two dimensional profile 74 of a Fresnel signature 76 (e.g., of field of view 50 of terminal 16) plotted in the form of normalized signal intensity or strength 78 as a function of obstruction clearance 80. FIG. 6 illustrates the amplitude variations of a Fresnel diffracted signal where the obstruction is relatively straight. The edge of such an obstruction would be located where the obstruction clearance 80 equals zero at point 81. The variance in the amplitude of the Fresnel signature 76 corresponds to the blockage environment at the terminal antenna.

Figure 9:
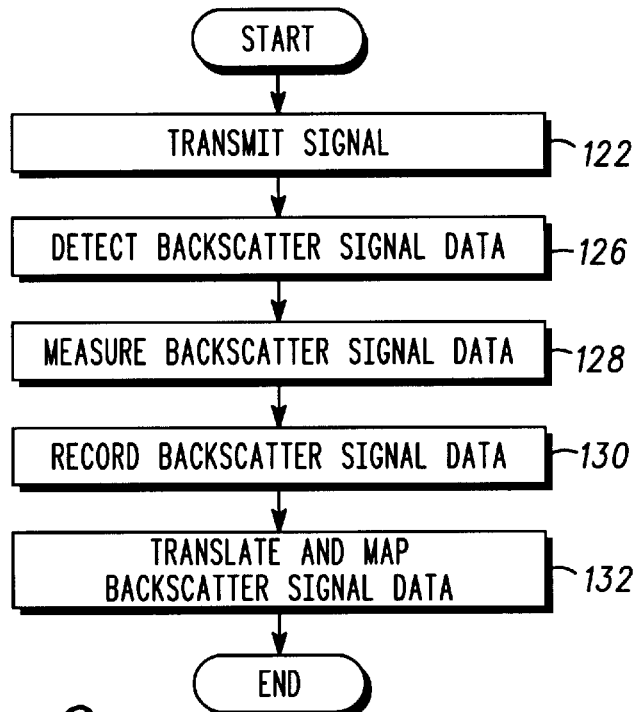
FIG. 9 is a flow chart of a method of creating a backscatter terminal blockage profile in accordance with a preferred embodiment of the present invention.

Referring back to FIG. 3, task 46 could further be performed by creating a backscatter terminal blockage profile by virtue of a backscatter technique. FIG. 9 is a flow chart of a method of creating a backscatter terminal blockage profile in accordance with a preferred embodiment of the present invention. In this regard, the backscatter terminal blockage profile (e.g., corresponding to field of view 50) is carried out in task 122 by first transmitting a signal from terminal 16 in each direction (azimuth and elevation) of interest. The signal could be produced from a transmitter housed at the site of terminal 16 and could be emitted via antenna 19 (FIG. 2) or a similar mechanism in the form of a radio frequency signal, an infrared signal, or perhaps an ultrasound signal.

Regarding a preferred embodiment, the emitted signal is preferably a high-frequency (e.g., Ka-band or above) signal, or an infrared laser, that will reflect off of the environmental obstructions within field of view 50 of the terminal antenna. After transmission of the signal from terminal 16, the signal will impact obstructions 52 and reflect back to terminal 16 in the form of backscatter signal data. The backscatter signal data is then detected by terminal 16 in task 126 and measured in task 128 much like conventional radar measurements. The measurements are then recorded in task 130 either at terminal 16 or one or more of the satellites 12. In this manner, antenna 19 could be equipped with detection capabilities for detecting the backscatter signal data. The recorded backscatter signal data, which would be generally representative of field of view 50 shown in FIG. 4, is then translated and mapped or plotted via an algorithm or other means in task 132 in the form of a map 140 as evidenced in FIG. 10. Note that although not shown identical, FIGS. 8 and 10 would be identical for the same terminal's field of view.

Figure 10:
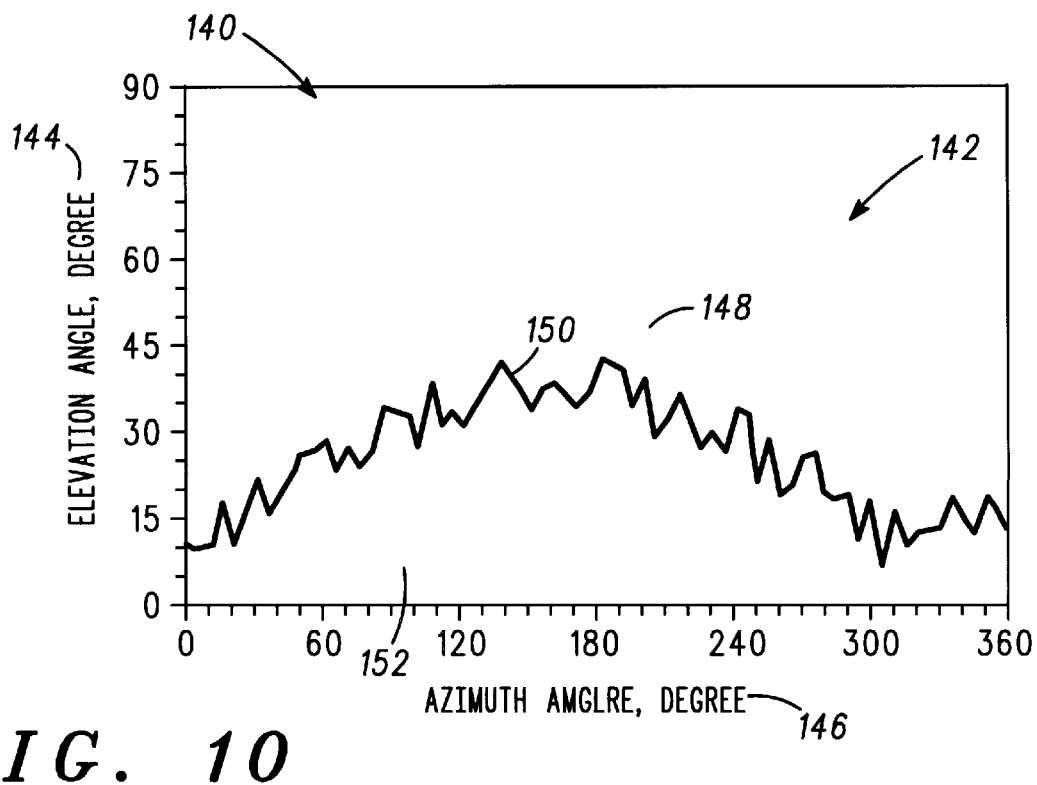
FIG. 10 is a backscatter terminal blockage profile of a field of view of a terminal derived in accordance with a preferred embodiment of the present invention.

FIG. 10 is an exemplary backscatter terminal blockage profile of a field of view of a terminal derived in accordance with a preferred embodiment of the present invention. Having similar characteristics to map 96 (FIG. 8) previously discussed, map 140 corresponds to a two dimensional blockage profile 142 of a backscatter representation of field of view 50 of terminal 16 plotted in the form of elevation angle 144 as a function of azimuth angle 146. Area 148 above curve 150 corresponds to unobstructed user sky 53 in which communication make take place and area 152 below curve 150 corresponds to a blockage region defined by obstructions 52 present within field of view 50.

Referring back to FIG. 3, after and/or concurrent with gathering fade and blockage data in task 46, a task 158 is performed which uses the fade and blockage data to create a terminal blockage profile (e.g., maps 72, 96, 140) of the field of view of the terminal antenna to establish where the user sky about terminal 16 is clear, shadowed, or blocked.

After the terminal blockage profile of the field of view 50 of the terminal antenna has been formed (e.g., by virtue of field of view measurements, Fresnel diffracted signal measurements, or backscatter measurements), the terminal blockage profile is then stored in task 160 for eventual use by service predictor unit 356. The terminal blockage profile could be stored either at terminal 16, a separate control facility, or one or more of the satellites 12 of the constellation.

It may be periodically necessary to update the terminal blockage profile because the local environmental obstructions at the site at which terminal 16 resides could change. Additionally, the terminal blockage profile could require continuous or frequent updating if the terminal is continuously or intermittently mobile. Updating the terminal blockage profile would necessarily involve selectively and periodically or aperiodically repeating, in relevant part, the foregoing method steps relating to the creation of the terminal blockage profile.

Figure 11:
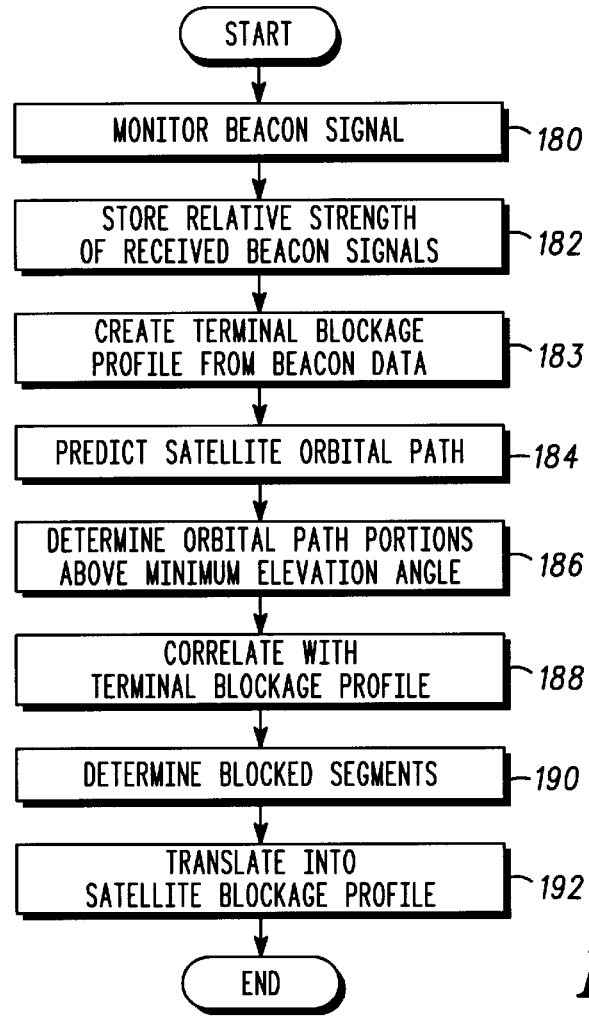
FIG. 11 is a flow chart of a method of creating a satellite blockage profile in accordance with a preferred embodiment of the present invention.

In furtherance of a preferred embodiment of the present invention, it is advantageous to determine satellite blockage profiles for use in making hand-off determinations and other system operation decisions. A satellite blockage profile maps blockage conditions between a terminal and a satellite from the satellite's perspective, whereas a terminal blockage profile maps the blockage environment from the terminal's perspective. Formation of a satellite blockage profile can be performed in several ways and takes place in task 163. FIG. 11 describes formation of a satellite blockage profile in accordance with a preferred embodiment of the present invention.

FIG. 11 is a flow chart of a method of creating a satellite blockage profile in accordance with a preferred embodiment of the present invention. The method described in conjunction with FIG. 11 does not need to use terminal blockage profile data derived in accordance with steps 46–160 of FIG. 3. Rather, terminal 16 is equipped with a beacon (e.g., an infrared transmitter) that emits a beacon signal which can be received by a satellite 12. During the course of a satellite pass (e.g., when satellite 12 is above a minimum elevation angle with respect to terminal 16), satellite 12 monitors this beacon signal in step 180 to determine the beacon's relative received strength. Where the received beacon signal is weak or non-existent, a partial or total obstruction between the satellite and terminal is likely. In another alternate embodiment, satellite 12 could be equipped with a beacon (rather than or in addition to terminal 16) and the beacon signals emitted by the satellite could be measured at the ground to determine obstructions.

The relative strengths of the received beacon signal measurements for a particular terminal are stored in task 182 to a database located either at terminal 16, a control facility, or one or more of the satellites 12 of the constellation. Data from numerous passes over a terminal can be combined to form a terminal blockage profile in step 183. This profile can be later processed to compute a map from a satellite's perspective that depicts the trajectory of the terminal as well as the time evolution of its blocking environment.

When blockage information is desired for an upcoming satellite pass with respect to a particular terminal, the satellite orbital path is predicted, in step 184, by either a satellite, a control facility, or a terminal. In step 186, at least those portions of the satellite orbital path for which the satellite will be located within the field of view of the terminal antenna is determined. In step 188, those portions of the orbital path are analyzed in the context with the data from the terminal blockage profile derived from beacon signal measurements.

Based on this analysis, segments of those portions during which a satellite-to-terminal communication link would be blocked, shadowed, or clear are determined in step 190. Desirably, this results in a set of times and/or satellite locations during which high-quality communications is possible between the satellite and terminal. In step 192, information describing the blocked, shadowed, and clear conditions are translated into a satellite blockage profile for that pass. Thus, performance of steps 180–192 result in the creation of a satellite blockage profile.

In a preferred embodiment, steps 180–182 are repeated each time a system satellite achieves a minimum angle of elevation with respect to the terminal, although selectively fewer repetitions could be performed. Repeated performance of steps 180–182 results in the creation of a cumulative database of blockage information. Steps 184–192 are performed each time a blockage profile for a particular satellite pass is desired.

As stated previously, to create a satellite blockage profile in accordance with FIG. 11, terminal blockage profile data derived from measurements made by the terminal is not necessary. Therefore, steps 46–160 of FIG. 3 need not necessarily be performed in order to achieve the advantages of the present invention.

Referring back to FIG. 3, the satellite blockage profile is stored in step 198 for eventual use by service predictor unit 356 of FIG. 12. Desirably, the satellite blockage profile is stored at terminal 16, although the profile could be stored in one or more satellites 12 or a control facility.

FIG. 3 additionally includes step 202 for receiving the weather model database. This database is in the form of a computer database which is specific for the general area of the customer location of terminal 16 and represents a prediction of system availability for non-blocked sky based upon the weather model and the frequency, broadcast and antenna characteristics of the system. The output of step 202 is a percentage of system success due to atmospheric conditions. The generation of a weather model database is described in at least two articles from the Proceedings of the Twenty-First NASA Propagation Experimenters Meeting (NAPEX XXI) and the Advanced Communications Technology Satellite (ACTS) Propagation Studies Miniworkshop held in El Segundo, Calif. in Jun. 11–13, 1997: (1) a NAPEX XXI article entitled "A New Rain-Rate Distribution Model: Preliminary Version for Annual Statistic", by R. K. Crane at the School of Meteorology at the University of Oklahoma published on Aug. 1, 1997, and (2) a NAPEX XXI article entitled "Fade Dynamics and its Evolution: The Other Part of the ACTS Rain Prediction Model", by Robert M. Manning of NASA's Space Communication Office, published on Aug. 1, 1997, the subject matter of which is incorporated by reference herein.

By virtue of an algorithm or other mechanism present at (1) terminal 16, (2) one or more of the satellites 12 of the constellation, or (3) a control facility, a response to the terminal blockage profile and/or the satellite blockage profile and/or the weather model data base could be made in task 200 prior to fading or blocking of one or more communication pathways or links.

In a preferred embodiment, step 200 utilizes terminal blockage profile, as generated from step 158, and/or satellite blockage profile, as generated from step 198 and/or weather model, as generated from step 202, to predict the successful communication linkage time of terminal 16 to one or more satellites within a satellite communication system.

Figure 13:
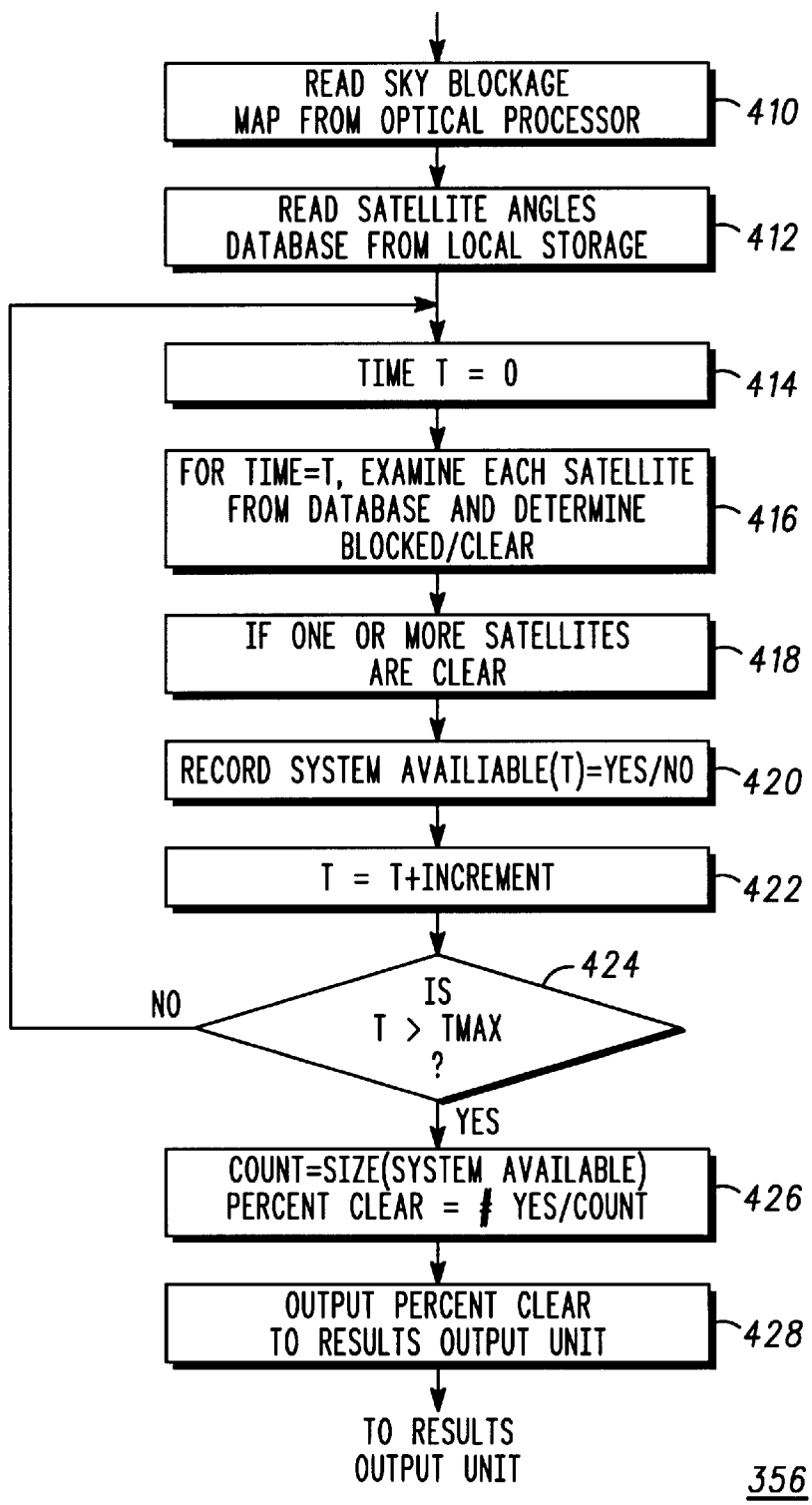
FIG. 13 is a flow chart of a method for predicting an individual ground-to-satellite terminal's percentage of successful communication linkage time to one or more satellites in accordance with a preferred embodiment of the present invention.

Referring now to FIG. 13, a flowchart of a method for predicting service availability of terminal 16 is shown. The steps shown in FIG. 13 are implemented within service predictor unit 356 of FIG. 12 and include the function performed by step 200 of FIG. 3 in greater detail.

First, a sky blockage map such as one shown in FIG. 8 is read. This map may be input, for example, from optical processor 352 of FIG. 12.

Also, the database containing satellite angles is read, for example, from a local storage device such as database 354 of FIG. 12.

Time (T) is set to zero pursuant to step 414.

For each time=T, each satellite of the constellation is examined from the database and it is determined whether each satellite is blocked or clear based upon the sky blockage map, as performed by step 416.

In a preferred embodiment, if one or more satellites are in clear view, then for that increment of time, the satellite system would be available. However, other system rules may be implemented herein such as the highest satellite must be in clear view in order to invoke a system availability for that particular time T. Alternately, the rules may require that two or more satellites must be in clear view in order to invoke a system availability for that particular time T. The final result, however, of step 414 is an output indicating whether the system is available or not at that particular time instance.

Figure 14:
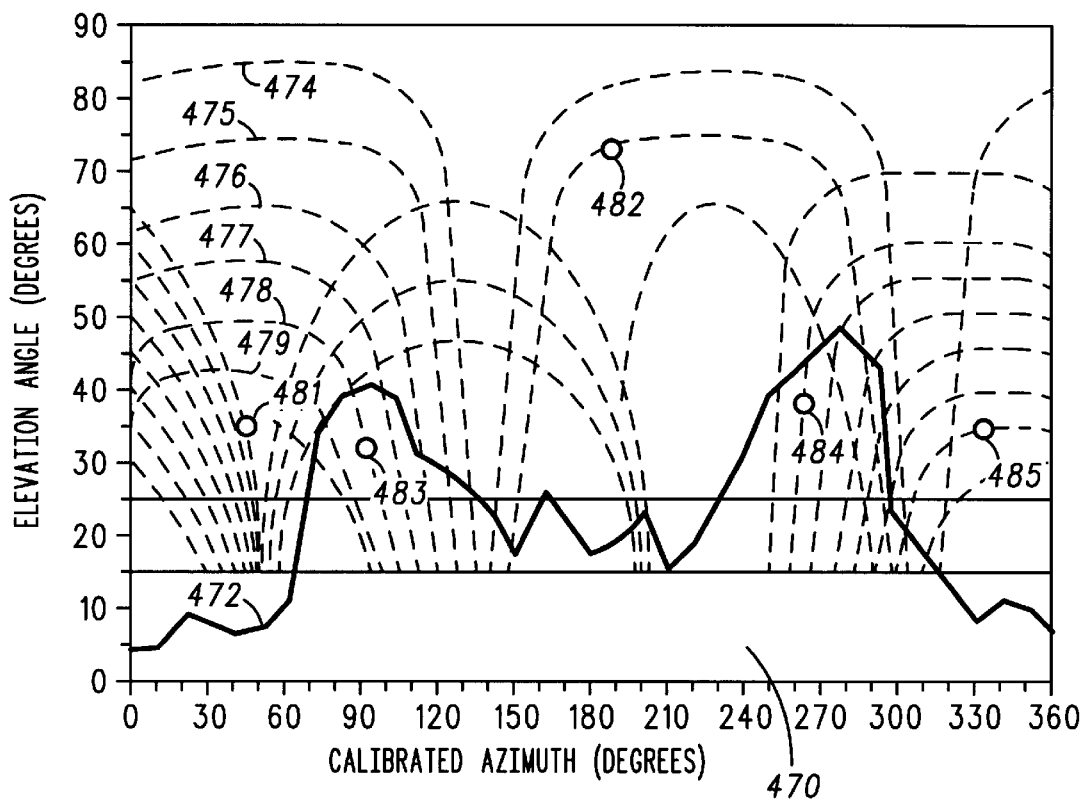
FIG. 14 is pictorial diagram illustrating a location, at a particular instance in time, of a plurality of satellites within a constellation superimposed with a sky blockage profile.

With reference to FIG. 14, a pictorial diagram, illustrating locations, at a particular instance in time (T), of a plurality of satellites within a constellation superimposed with a sky blockage profile. Area 470 under curve 472 represents a terminal blockage profile obtained from a field of view of a given antenna location of a terminal. Curve 472 is similar to curve 105 of FIG. 8 which represented a terminal blockage profile of a field of view of the terminal antenna. However, it is understood that such terminal blockage profile could be obtained from other methods such as Fresno defracted signal measurements and backscatter signal data as discussed herein.

Dotted lines 470–479 represent satellite passes for the plurality of satellites within a given satellite constellation. Such satellite pass information may be obtained from the results of the method as described with respect to FIG. 11 or may be supplied via a data base containing such satellite pass information. Further, at a particular instance in time, circles 481–485 represent locations of a plurality of satellites within that constellation.

From such a pictorial diagram, for each instance in time, one can easily determine whether there is at least one satellite in clear view. For example, any satellite appearing below curve 472 such as satellites 483 and 484, are not in view of the antenna at this particular location for this instance in time (T). However, any satellite appearing above curve 472, such as satellites 481, 482 and 485, are all satellites that are in clear view of the antenna at this particular location and for this instance in time. Accordingly, in a preferred embodiment, if at least one of the satellites at this particular instance in time (T) is above curve 472, then it may be indicated that the system is available and a communication link does exist to at least one satellite.

The output of step 418 is recorded as a typical yes or no for system availability for that particular instance in time, as shown in step 420. For example, a yes result, i.e., system availability, may be recorded as a logic "1" and a no result may be recorded as a logic "0".

T is incremented by the sampling period, as shown in step 422, where in a preferred embodiment, the incremental period is 3 seconds.

If T<Tmax, then steps 416 through 422 are performed again for this new value of time. In this manner, several samples are taken over a finite and predetermined period of time to determine whether there is system availability for each instance of time T. In a preferred embodiment, the incremental time factor is three (3) seconds, as mentioned above, while the time interval (Tmax) is two (2) hours. However, it is understood that a plurality of time periods may be used along with a plurality of time increments with the basic intent to obtain a plurality of samples that sufficiently represent the location of satellites from the perspective of the location of the terminal.

Once T>Tmax, step 426 is performed whereby the percent clear is calculated as the number of yes occurrences stored in memory, via step 420, divided by the total count or samples taken over the time period as determined by Tmax.

Step 428 outputs this percent clear to results output unit 360 of FIG. 12 whereby the output of step 428 is a number between 0 and 1 indicating the percent clear based upon the sky blockage map and satellite angle database, as input via steps 410 and 412.

The service predictor unit, in accordance with the present invention, combines the location's sky blockage profile with the satellite pointing angle data and an optional weather model to give a substantial improvement over existing methods of experimental receivers. The basis of the improvement is the ability to predict future system performance based upon satellite motion and specific location of the receiver. As an application for the present invention, communication systems using non-geosynchronous satellites may make use of this service predictor unit to evaluate antenna locations for each and every customer. The predictor would not have to be permanently located at the customer location, only used to help determine antenna placement. The service predictor unit could also be included permanently in a customer ground station located in a moveable vehicle. With the fisheye camera permanently mounted on the roof, the predictor could be used every time the vehicle parks to evaluate how good the system performance will be for that specific location. The user would then use the service predictor units output to decide upon the best location for setting up.

Figure 15:
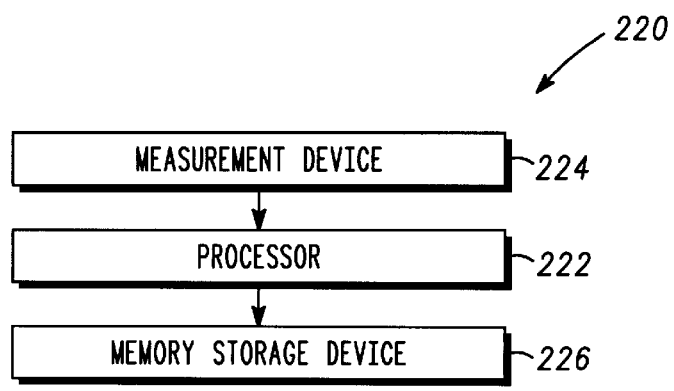
FIG. 15 is a simplified block diagram of a terminal in accordance with a preferred embodiment of the present invention.

FIG. 15 is a simplified block diagram of a terminal in accordance with a preferred embodiment of the present invention. Terminal 220 includes processor 222 and memory storage device 226. Memory storage device 226 is capable of storing a terminal blockage profile as well as a satellite blockage profile and a weather model. As described in conjunction with various embodiments of the invention, the terminal blockage profile could include, for example, a map of the environment experienced by the terminal antenna which could be a map derived from signal measurements (e.g., Fresnel diffracted signal measurements), a field of view map, or a backscatter data map. In alternate embodiments, a terminal blockage profile could be stored at a control facility, a satellite, or a combination thereof.

Processor 222 is used to respond to the terminal blockage profile, when necessary. Such response could be initiated by processor 222, for example, or could result from the receipt of an instruction directing processor 222 to respond to the terminal blockage profile. Responding to the terminal blockage profile, for example, could involve processor 222 executing an algorithm for initiating one or more hand-offs to one or more satellites. In a preferred embodiment, processor 222 is also for periodically initiating update of the terminal blockage profile.

In a preferred embodiment, terminal 220 also includes measurement device 224. Measurement device 224 is not necessary in those embodiments where terminal 220 does not gather data for its blockage profile. However, in those embodiments where terminal 220 does gather data for the terminal blockage profile, measurement device 224 could be, for example, a device for detecting Fresnel diffracted signals, an optical fisheye lens camera, or a backscatter signal detection device.

In summary, the present invention provides a system and method which inhibits fading and blocking of communication pathways or links in a non-geosynchronous communication system. The present invention operates to establish a terminal blockage profile and/or a satellite blockage profile with respect to a terminal antenna. Having knowledge of the blockage environment experienced by the terminal antenna and knowledge of the instantaneous positions of one or more satellites in a constellation of non-geosynchronous satellites, the present invention includes the provision of responding to this information, for example, by predicting an individual ground-to-satellite radio's percentage of successful communication linkage time to one or more satellites of a satellite communication system.

The present invention has been described above with reference to a preferred embodiment. However, those skilled in the art will recognize that changes and modifications could be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

What is claimed is:

1. A method for predicting a ground-to-satellite terminal's percentage of successful communication linkage time to one or more satellites of a satellite communication system based upon proximity of an antenna of the radio, the method comprising the steps of:

receiving a terminal blockage profile based upon a location of the antenna of the ground-to-satellite terminal;

receiving a satellite blockage profile of one or more satellites;

using the terminal blockage profile and the satellite blockage profile to determine a percentage of successful communication linkage time between the terminal and at least one satellite, wherein the step of using includes the substeps of:

(a) determining, for a particular time instance, whether at least one satellite is in clear view of the antenna;

(b) recording a result of step (a);

(c) adjusting the particular time instance to obtain a different time instance;

(d) repeating steps (a)–(c) over a predetermined time period; and (e) using the recorded results to determine the percentage of successful communication linkage time.

2. The method of claim 1 further including the steps of:

receiving a weather model data base; and using the weather model data base to determine the percentage of successful communication linkage time between the terminal and at least one satellite.

3. The method of claim 1, wherein the step of receiving a terminal blockage profile further include creating the terminal blockage profile including the steps of:

gathering, by the terminal, blockage data at the antenna of the terminal; and mapping the blockage data to a blockage profile database.

4. The method of claim 3, wherein the step of gathering blockage data further includes the step of gathering Fresnel zone signal data from one or more line-of-sight communication link signals.

5. The method of claim 4, wherein the step of gathering Fresnel zone signal data from one or more line-of-sight communication link signals further includes the steps of:

monitoring the Fresnel zone signal data from the one or more line-of-sight communication link signals over a sliding time window; and recording the Fresnel zone signal data.

6. The method of claim 5, wherein the step of mapping the fade and blockage data to a blockage profile database further includes the steps of:

averaging Fresnel zone signal data variations of the Fresnel zone signal data to form a Fresnel zone signal threshold; and plotting the Fresnel zone signal threshold in the form of minimum elevation angle as a function of azimuth angle.

7. The method of claim 3, wherein the step of gathering blockage data further includes the step of measuring data describing a field of view of the antenna of the terminal wherein the measurements can be taken anywhere along a spectrum.

8. The method of claim 3, wherein the step of gathering blockage data further includes the step of forming a backscatter representation of a field of view of the terminal antenna.

9. The method of claim 8, wherein the step of forming a backscatter representation of a field of view of the antenna of the terminal further includes the steps of:

transmitting signal data;

detecting backscatter signal data resulting from the transmitted signal data; and recording the backscatter signal data.

10. The method of claim 9, wherein the step of mapping the fade and blockage data to a blockage profile database further includes the step of plotting the backscatter signal data in the form of minimum elevation angle as a function of azimuth angle.

11. The method of claim 1 further including the step of storing the terminal blockage profile.

12. The method of claim 1, further including the step of periodically updating the terminal blockage profile.

13. The method of claim 1, wherein the step of receiving the satellite blockage profile further includes creating a satellite blockage profile of one or more satellites including the steps of:

monitoring a beacon signal transmitted by the terminal; and storing beacon signal measurements describing a relative strength of the beacon signal into a database.

14. The method of claim 1 further including the step of storing the satellite blockage profile.

15. An apparatus for predicting a ground-to-satellite terminal's percentage of successful communication linkage time to one or more satellites of a satellite communication system based upon proximity of an antenna of the terminal, comprising:

a memory having terminal blockage profile data, corresponding to a field of view of a location of the antenna, and satellite blockage profile data stored thereon; and a service predictor unit, responsive to the terminal blockage profile and the satellite blockage profile, for determining a percentage of successful communication linkage time between the terminal and at least one satellite of the satellite communication system, wherein the service predictor unit includes:

means for determining, for a particular time instance, whether at least one satellite is in clear view of the antenna;

means for recording an output of the means for determining;

means for adjusting the particular time instance to obtain a different time instance; and means, responsive to the means for recording to determine the percentage of successful communication linkage time.

16. The apparatus of claim 15 further wherein the memory further includes a weather model data base stored thereon.

17. A method for predicting a ground-to-satellite terminal's percentage of successful communication linkage time to one or more satellites of a satellite communication system, the method comprising the steps of:

receiving a terminal blockage profile based upon a location of the antenna of the ground-to-satellite terminal;

storing the terminal blockage profile in a storage device;

receiving a satellite blockage profile of one or more satellites;

storing the satellite blockage profile;

receiving a weather model data base; and using the terminal blockage profile, the satellite blockage profile and the weather model data base to determine a percentage of successful communication linkage time between the terminal and at least one satellite, wherein the step of using includes the steps of:

(a) determining, for a particular time instance, whether at least one satellite is in clear view of the antenna;

(b) recording a result of step (a);

(c) adjusting the particular time instance to obtain a different time instance;

(d) repeating steps (a)–(c) over a predetermined time period; and (e) using the recorded results to determine the percentage of successful communication linkage time.

18. The method of claim 17, wherein the step of receiving a terminal blockage profile further includes creating the terminal blockage profile including the steps of:

gathering, by the terminal, blockage data at the antenna of the terminal; and mapping the blockage data to a blockage profile database.

19. The method of claim 18, wherein the step of gathering blockage data further includes the step of measuring data describing a field of view of the antenna of the terminal wherein the measurements can be taken anywhere along a spectrum.

20. The method of claim 18, wherein the step of gathering blockage data further includes the step of forming a backscatter representation of a field of view of the terminal antenna.

21. The method of claim 18, wherein the step of gathering blockage data further includes the step of gathering Fresnel zone signal data from one or more line-of-sight communication link signals.

22. The method of claim 18, wherein the step of gathering blockage data further includes the step of using a directional laser range finder.

23. The method of claim 17, wherein the step of receiving the satellite blockage profile further includes creating a satellite blockage profile of one or more satellites including the steps of:

monitoring a beacon signal transmitted by the terminal; and storing beacon signal measurements describing a relative strength of the beacon signal into a database.

\* \* \* \* \*